(12) United States Patent
Morita et al.

(10) Patent No.: US 10,425,231 B2
(45) Date of Patent: Sep. 24, 2019

(54) INFORMATION PROCESSING APPARATUS AND METHOD FOR AUTHENTICATING MESSAGE

(71) Applicant: HITACHI AUTOMOTIVE SYSTEMS, LTD., Hitachinaka-shi, Ibaraki (JP)

(72) Inventors: Nobuyoshi Morita, Tokyo (JP); Keisuke Hakuta, Tokyo (JP); Toru Owada, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 133 days.

(21) Appl. No.: 15/525,978

(22) PCT Filed: Nov. 11, 2015

(86) PCT No.: PCT/JP2015/081740
§ 371 (c)(1),
(2) Date: May 11, 2017

(87) PCT Pub. No.: WO2016/076358
PCT Pub. Date: May 19, 2016

(65) Prior Publication Data
US 2017/0324557 A1    Nov. 9, 2017

(30) Foreign Application Priority Data

Nov. 13, 2014 (JP) .................. 2014-230715

(51) Int. Cl.
*H04L 29/06* (2006.01)
*H04L 9/32* (2006.01)

(52) U.S. Cl.
CPC .............. *H04L 9/3226* (2013.01); *H04L 9/32* (2013.01); *H04L 63/08* (2013.01); *H04L 63/123* (2013.01)

(58) Field of Classification Search
CPC ......... H04L 9/3226; H04L 9/32; H04L 63/08; H04L 63/123
See application file for complete search history.

(56) References Cited

U.S. PATENT DOCUMENTS

2014/0270163 A1    9/2014  Merchan et al.
2014/0310530 A1   10/2014  Oguma et al.

FOREIGN PATENT DOCUMENTS

JP        10-269290 A    10/1998
JP      2005-252709 A     9/2005
(Continued)

OTHER PUBLICATIONS

International Search Report, PCT/JP2015/081740, dated Feb. 16, 2016, 1 pg.
(Continued)

*Primary Examiner* — Mahfuzur Rahman
(74) *Attorney, Agent, or Firm* — Volpe and Koenig, P.C.

(57) ABSTRACT

An information processing apparatus includes a shared information generation unit for generating shared information via a network, a communication unit configured to receive a message, a shared information verification unit configured to compare shared information in the message with the information generated by the shared information generation unit, and verify validity of the shared information in the message based on the comparison, a security code generation unit for generating a security code based on the shared information, a security code verification unit configured to compare a security code in the message with the security code generated by the security code generation unit, and verify correctness of the shared information in the message based on the comparison, and a processing determination control unit configured to determine normality of the message on the based on the verification by the shared (Continued)

information verification unit and the verification by the security code verification unit.

8 Claims, 14 Drawing Sheets

(56) References Cited

FOREIGN PATENT DOCUMENTS

| JP | 2013-048374 A | 3/2013 |
| JP | 2013-098719 A | 5/2013 |

OTHER PUBLICATIONS

Extended European Search Report dated Apr. 26, 2018 for the European Patent Application No. 15858297.3.
Nilsson et al., "Efficient In-Vehicle Delayed Data Authentication Based on Compound Message Authentication Codes," 2008 IEEE 68th Vehicular Technology Conference, Calgary, BC, pp. 1-5 (2008).

FIG. 5

| | 1070 |
|---|---|
| SHARED INFORMATION | |
| 1071 | 1072 |
| COMMUNICATION PATH COUNTER VALUE | RANDOM NUMBER |
| R1 | r_1 |
| R2 | r_2 |
| R3 | r_3 |
| ... | ... |

INFORMATION PROCESSING APPARATUS AND METHOD FOR AUTHENTICATING MESSAGE

TECHNICAL FIELD

The present invention relates to information processing apparatuses used while connected to a network and a method for authenticating a message among a plurality of information processing apparatuses connected to a network.

BACKGROUND ART

Currently, a controller area network (CAN) is prevalent as a representative standard protocol for automotive in-vehicle networks. In the future, it is expected that a CAN with flexible data-rate (FD), which is an extension to the CAN, will also be prevalent.

Such an in-vehicle network is at risk of illegal attacks against communication by intruders. Generally, a vehicle is provided with a diagnostic interface, which is directly connected to an in-vehicle network, called an on-board-diagnostics 2 (OBD2) port. A risk is that for example, an intruder connects an illegal device to this OBD2 port, and makes a replay attack or the like against the in-vehicle network using such a device. Here, a replay attack is an attack by an intruder eavesdropping and capturing a message flowing on a communication path in advance and retransmitting the captured message, thereby causing illegal operation of each device in the in-vehicle network. Another conceivable attack is, for example, an attack that infects with malware an information processing apparatus that operates in cooperation with a system outside the vehicle, causing the infected apparatus to transmit a false message to an in-vehicle network and then causing a control apparatus that has received this message to malfunction.

As an effective countermeasure against the threat of the illegal attacks described above, performing message authentication using a message authentication code (MAC) as a tampering detection code for a message flowing between each information processing apparatus in an in-vehicle network (PTL 1) is known. According to the technique disclosed in this PTL 1, each information processing apparatus counts the number of times a message is transmitted for each message ID. Then, an information processing apparatus that transmits a message generates a MAC from data, the number of times of transmission, and the message ID, and transmits the MAC separately from the message. On the other hand, an information processing apparatus that receives the message calculates the MAC on the basis of the data, the number of times of transmission, and the message ID in the message that has been received, and compares the MAC with the MAC separately received from the information processing apparatus on the transmitting side. As a result, when these MACs are different from each other, the message that has been received is recognized as illegal, and no message with this message ID is accepted thereafter. This prevents the information processing apparatuses from malfunctioning due to replay attacks or data tampering.

CITATION LIST

Patent Literature

PTL 1: JP 2013-98719 A

SUMMARY OF INVENTION

Technical Problem

In general, the MAC used in the technique described in PTL 1 is susceptible to noise as its characteristics. Therefore, when the value of the MAC is changed due to the noise mixed into a message, an information processing apparatus that has received this message recognizes the message as an illegal message although the message is not an illegal message. As a result, this information processing apparatus erroneously determines that an illegal attack has been made thereupon, and even when the noise is mixed, the information processing apparatus carries out the above-described countermeasure that is supposed to be carried out only under illegal attack. Consequently, although no illegal attack is made thereupon, the information processing apparatus on the receiving side performs operations that interfere with driving of the vehicle, for example, whereby the user is subjected to less-practical operations.

The present invention has been made in view of the foregoing. A main object of the present invention is to correctly determine whether a message that has been received by each information processing apparatus connected to a network is due to an illegal attack.

Solution to Problem

An information processing apparatus according to the present invention receives a message transmitted from another information processing apparatus connected via a network, and includes a shared information generation unit configured to generate shared information to be shared with the other information processing apparatus, a communication unit configured to receive the message, a shared information verification unit configured to compare shared information included in the message with the shared information generated by the shared information generation unit, and verify validity of the shared information included in the message on the basis of a result of the comparison, a security code generation unit configured to generate a security code based on the shared information, a security code verification unit configured to compare a security code included in the message with the security code generated by the security code generation unit, and verify correctness of the shared information included in the message on the basis of a result of the comparison, and a processing determination control unit configured to determine normality of the message on the basis of a result of the verification by the shared information verification unit and a result of the verification by the security code verification unit.

A method for authenticating a message according to the present invention is a method for authenticating a message transmitted and received between two information processing apparatuses connected via a network, and includes, by an information processing apparatus that receives the message, a first processing step of generating shared information to be shared between the two information processing apparatuses, a second processing step of receiving the message, a third processing step of comparing shared information included in the message received in the second processing step with the shared information generated in the first processing step, and verifying validity of the shared information included in the message on the basis of a result of the comparison, a fourth processing step of generating a security code based on the shared information, a fifth processing step of comparing a security code included in the message received in the second processing step with the security code generated in the fourth processing step, and verifying correctness of the shared information included in the message on the basis of a result of the comparison, and a six processing step of determining normality of the message on the basis of a result of the verification in the third processing step and a result of the verification in the fifth processing step.

Advantageous Effects of Invention

According to the present invention, it is possible to correctly determine whether a message received by each information processing apparatus connected to a network is due to an illegal attack.

BRIEF DESCRIPTION OF DRAWINGS

FIG. 5 is a diagram illustrating an example of a table configuration of shared information.

DESCRIPTION OF EMBODIMENTS

Hereinafter, embodiments of the present invention will be described in detail with reference to the drawings.

First Embodiment

Hereinafter, a description will be given of an information processing apparatus and a method for authenticating a message according to an embodiment of the present invention. In the present embodiment, a description will be given of an example in which a plurality of information processing apparatuses connected via a network authenticates a message transmitted and received between each information processing apparatus by using shared information shared between each information processing apparatus and an error detecting code serving as a security code.

Figure 1:
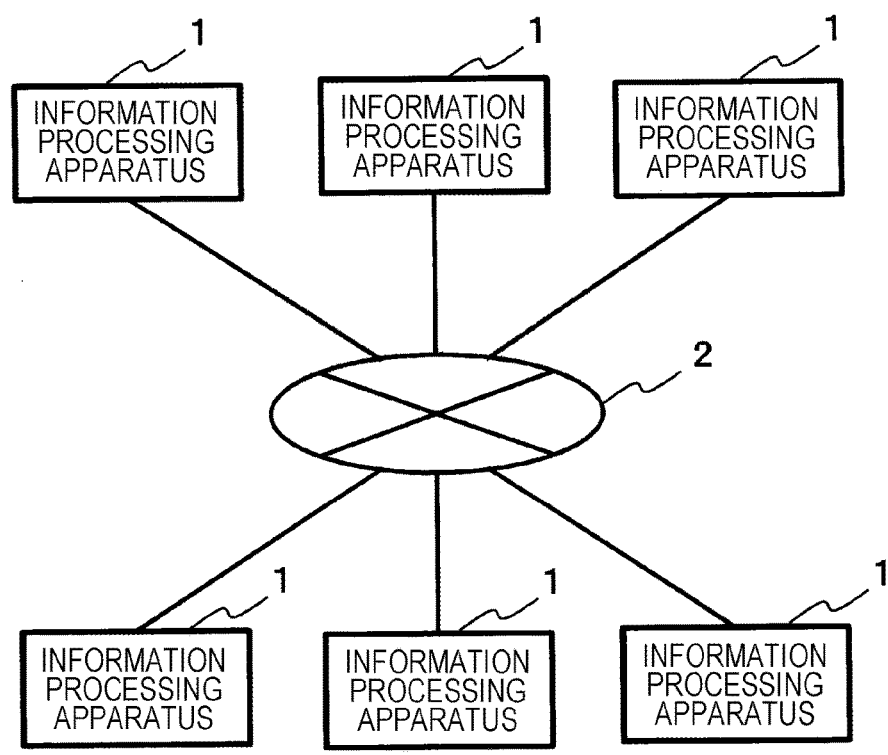
FIG. 1 is a diagram illustrating an exemplary configuration of an information processing system.

FIG. 1 is a diagram illustrating an exemplary configuration of an information processing system according to an embodiment of the present invention. The information processing system illustrated in FIG. 1 is configured with a plurality of information processing apparatuses 1 connected to each other via a network 2. For example, the information processing system in FIG. 1 is configured with various kinds of in-vehicle electronic control units (ECUs) connected to each other via an in-vehicle network, that is, a controller area network (CAN) or a CAN FD. In this case, each ECU corresponds to each of the information processing apparatuses 1, and the CAN or the CAN FD corresponds to the network 2. However, the application range of the present invention is not limited thereto. The present invention is applicable to various kinds of information processing systems.

Figure 2:
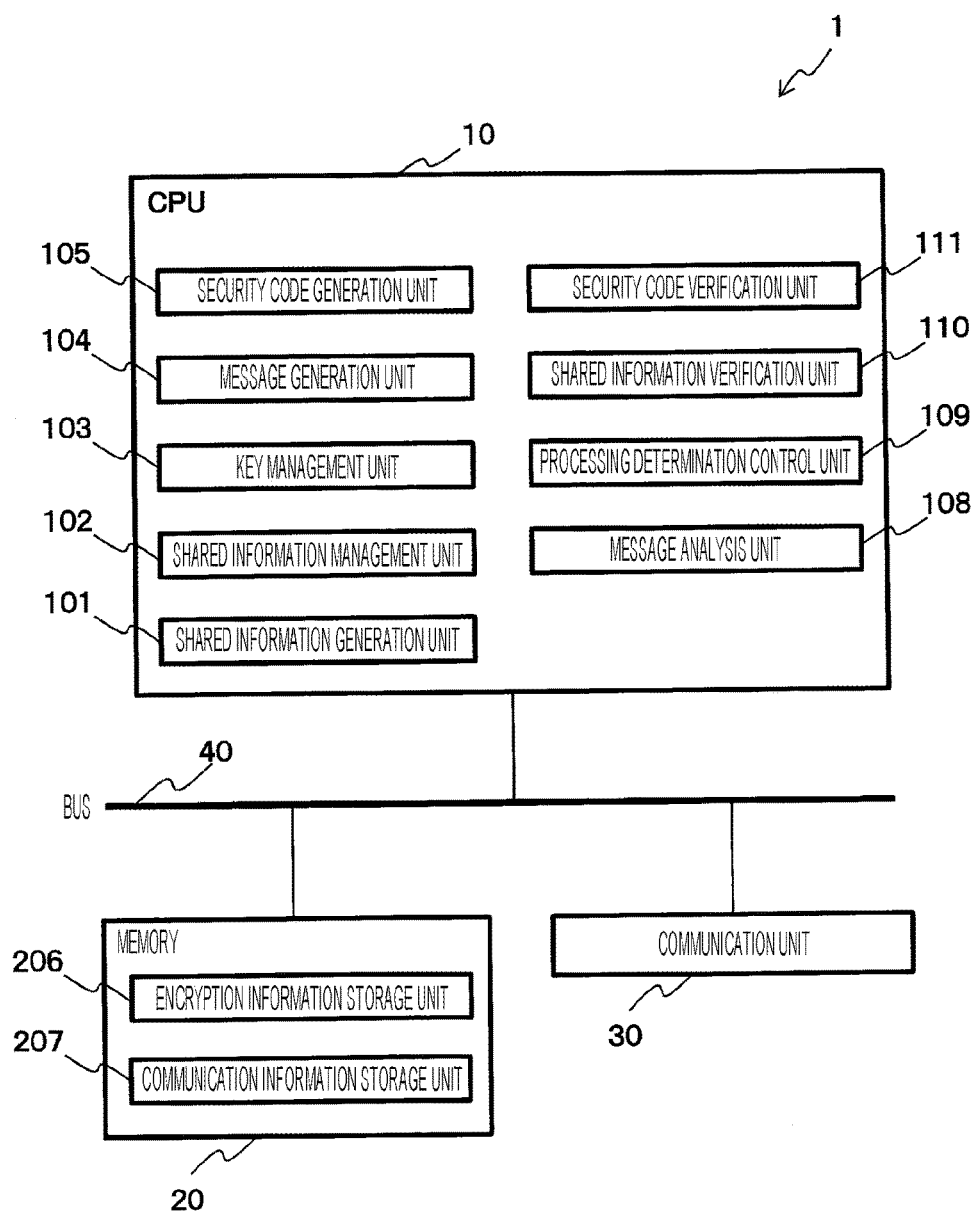
FIG. 2 is a diagram illustrating an exemplary configuration of an information processing apparatus.

FIG. 2 is a diagram illustrating an exemplary configuration of the information processing apparatus 1. As illustrated in FIG. 2, the information processing apparatus 1 is configured with a CPU 10, a memory 20, and a communication unit 30 connected to each other via a bus 40.

The CPU 10 functionally includes a shared information generation unit 101, a shared information management unit 102, a key management unit 103, a message generation unit 104, a security code generation unit 105, a message analysis unit 108, a processing determination control unit 109, a shared information verification unit 110, and a security code verification unit 111. The CPU 10 can operate as each of these functional units through the control of the memory 20 and the communication unit 30 by executing a predetermined program. It is to be noted that each of these functional units will be described in detail later.

The program to be executed by the CPU 10 may be stored in the memory 20 in advance. Alternatively, a program necessary for the operation of the CPU 10 may be acquired via a storage medium connected to an input/output interface which is not illustrated or a communication medium which is not illustrated. In this case, the acquired program can also be stored in the memory 20.

The memory 20 is a section for storing the above-described program and various kinds of data necessary for the operation of the CPU 10. The memory 20 can include, for example, a primary storage apparatus and a secondary storage apparatus. Data communication between the CPU 10 and the memory 20 is performed via the bus 40. The memory 20 functionally includes an encryption information storage unit 206 and a communication information storage unit 207. It is to be noted that each of these functional units will be described in detail later.

The communication unit 30 is connected to the network 2 in FIG. 1 and operates in accordance with the control of the CPU 10. Through the network 2, the communication unit 30 transmits a message to another information processing apparatus 1 and receives a message transmitted from another information processing apparatus 1. A message to be transmitted to another information processing apparatus 1 by the communication unit 30 is output from the CPU 10 to the communication unit 30 via the bus 40. In addition, a message received from another information processing apparatus 1 by the communication unit 30 is output from the communication unit 30 to the CPU 10 via the bus 40.

Next, a description will be given of each of the functional units that the CPU 10 and the memory 20 include individually.

The shared information generation unit 101 generates shared information to be shared between each information processing apparatus 1. The shared information generated by the shared information generation unit 101 is stored in the encryption information storage unit 206.

The shared information management unit 102 manages the shared information. For example, the shared information management unit 102 acquires information necessary for the shared information generation unit 101 to generate shared information, and updates the shared information according to the number of messages and the message type.

The key management unit 103 manages key data for use in the generation of encrypted shared information and security code.

The message generation unit 104 generates an outgoing message from the information processing apparatus 1 to another information processing apparatus 1. The outgoing message generated by the message generation unit 104 is output to the communication unit 30, which is then transmitted from the communication unit 30 to another information processing apparatus 1.

The security code generation unit 105 generates a security code for use in authentication of a message transmitted to and received from another information processing apparatus 1. It is to be noted that in the present embodiment, the security code generation unit 105 generates an error detecting code as a security code.

The message analysis unit 108 analyzes the data structure of an incoming message which has been received from another information processing apparatus 1 by the communication unit 30, and extracts data, shared information, a security code, and the like included in the incoming message.

The shared information verification unit 110 compares the shared information of the incoming message extracted by the message analysis unit 108 with the shared information generated by the shared information generation unit 101, and verifies the validity of the shared information included in the incoming message on the basis of the comparison result.

The security code verification unit 111 compares the security code of the incoming message which has been extracted by the message analysis unit 108 with the security code generated by the security code generation unit 105, and verifies the validity of the shared information included in the incoming message on the basis of the comparison result.

The encryption information storage unit 206 stores encryption information related to the encryption of the shared information and the security code. For example, the encryption information storage unit 206 stores initial values, the above-described key data, and the like as encryption information, which are used when the shared information generation unit 101 and the security code generation unit 105 encrypt the shared information and the security code, respectively.

The communication information storage unit 207 stores communication information necessary to transmit and receive a message to and from another information processing apparatus 1. For example, the communication information storage unit 207 stores, as communication information, a counter value of a message, a processing determination counter value used for determining a message type, and the like.

It is to be noted that the information processing apparatus 1 may be configured excluding the message generation unit 104 and the security code generation unit 105 among the functional units described above. In other words, the CPU 10 may only include the shared information generation unit 101, the shared information management unit 102, the key management unit 103, the message analysis unit 108, the processing determination control unit 109, the shared information verification unit 110, and the security code verification unit 111. In this case, the information processing apparatus 1 can be used as an information processing apparatus for message authentication, which does not have a message transmission function.

Figure 3:
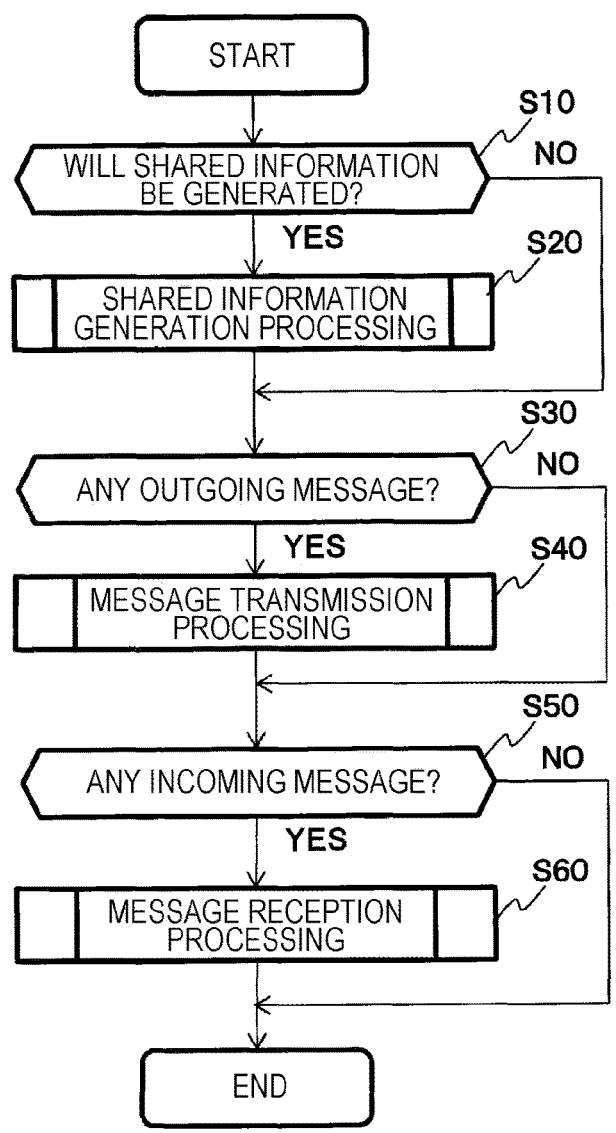
FIG. 3 is a flowchart of processing to be executed by a central processing unit (CPU).

FIG. 3 is a flowchart of processing to be executed by the CPU 10. The CPU 10 repeatedly executes the processing in accordance with the flowchart in FIG. 3 at predetermined cycles.

In step S10, the CPU 10 determines whether to generate shared information. The shared information is generated at a predetermined timing, for example, when the engine of the vehicle is started, immediately before communication with another information processing apparatus 1 starts, or during communication. In cases corresponding to such a generation timing of the shared information, the CPU 10 determines the generation of the shared information and proceeds to step S20, or proceeds to step S30 otherwise.

In step S20, the CPU 10 executes shared information generation processing by the shared information generation unit 101 and the shared information management unit 102. The specific details of this shared information generation processing will be described later with reference to the flowchart in FIG. 4.

In step S30, the CPU 10 determines whether there is any outgoing message to another information processing apparatus 1. When there is an outgoing message, the CPU 10 proceeds to step S40, and when there is not, the CPU 10 proceeds to step S50.

In step S40, the CPU 10 executes message transmission processing by the message generation unit 104 and the security code generation unit 105. The specific details of this message transmission processing will be described later with reference to the flowchart in FIG. 6.

In step S50, the CPU 10 determines whether there is any incoming message from another information processing apparatus 1. When there is an incoming message, the CPU 10 proceeds to step S60, and when there is not, the CPU 10 ends the processing of the flowchart in FIG. 3.

In step S60, the CPU 10 executes message reception processing by the message analysis unit 108, the processing determination control unit 109, the shared information verification unit 110, and the security code verification unit 111. The specific details of this message reception processing will be described later with reference to the flowchart in FIG. 8. After executing the processing in step S60, the CPU 10 ends the processing of the flowchart in FIG. 3.

It is to be noted that the processing from step S10 to step S40 and the processing from step S50 to step 60 may be performed in parallel as different processes.

Figure 4:
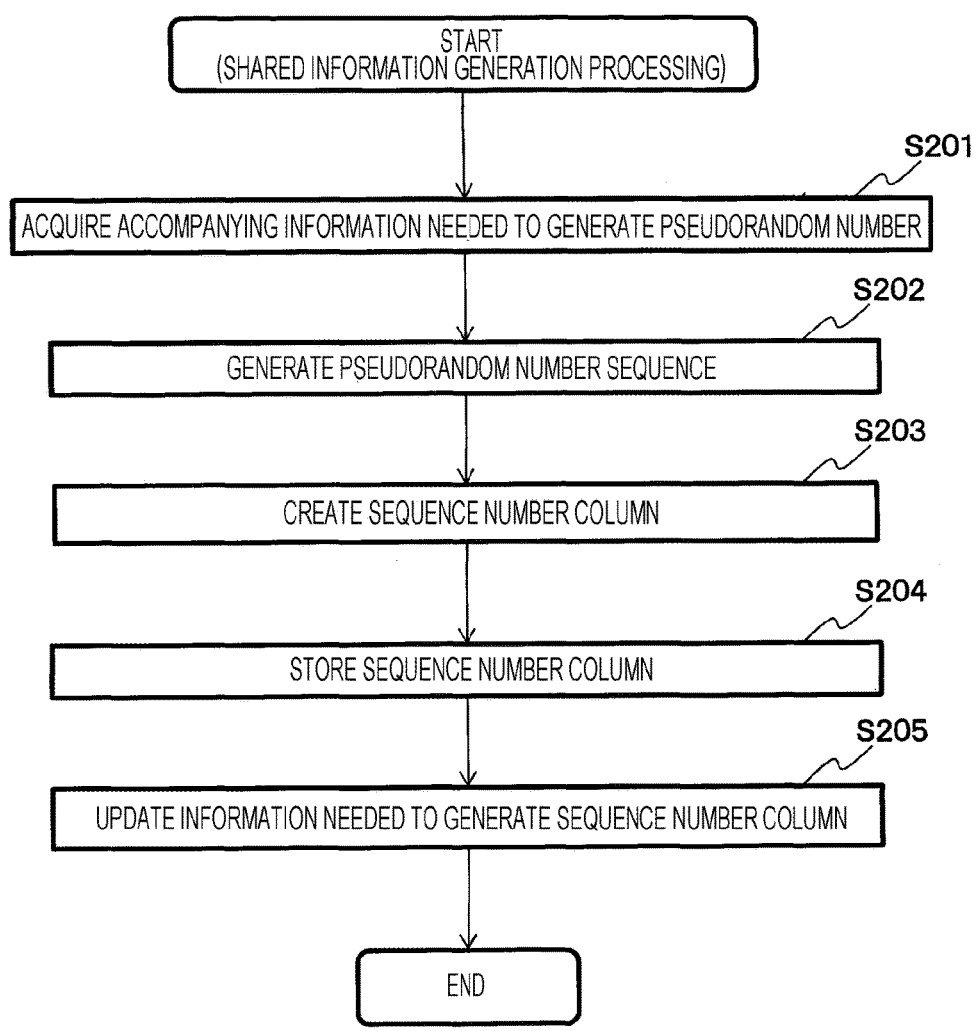
FIG. 4 is a flowchart of shared information generation processing.

Next, a description will be given of the shared information generation processing which is executed in step S20 of FIG. 3. In step S20, the CPU 10 can generate shared information in the shared information generation unit 101 through the generation of sequence numbers by using a pseudorandom number generator, for example. FIG. 4 is a flowchart of the shared information generation processing for this case.

In step S201, the shared information management unit 102 acquires, from the encryption information storage unit 206, accompanying information necessary for the pseudo-random number generator to generate pseudorandom numbers. Here, the accompanying information can be acquired by reading the accompanying information stored in a predetermined location in the encryption information storage unit 206 on the basis of the information indicating the reference destination of the preset accompanying information. The shared information management unit 102 acquires, as accompanying information, a seed of the pseudorandom number generator, auxiliary information for generating pseudorandom numbers, the internal state of the pseudorandom number generator, and the like. It is to be noted that the auxiliary information is, for example, an initialization vector (IV) for determining the initial value of the pseudorandom number generator. Additionally, the internal state of the pseudorandom number generator is information necessary for the generation of the next and succeeding pseudorandom numbers, and changes according to the number of pseudorandom numbers that have been generated by the pseudorandom number generator up to the present.

In step S202, the shared information generation unit 101 generates a pseudorandom number sequence using the accompanying information acquired in step S201.

In step S203, the shared information generation unit 101 creates a sequence number column on the basis of the pseudorandom number sequence generated in step S202. Here, the sequence number column can be created by sequentially creating and arranging the sequence numbers for the respective pseudorandom numbers constituting the pseudorandom number sequence, in accordance with a predetermined method.

In step S204, the shared information management unit 102 stores, as the shared information, the sequence number column generated in step S203 in the encryption information storage unit 206.

FIG. 5 is a diagram illustrating an example of a table configuration of shared information 1070 stored in the encryption information storage unit 206 in step S204. In the shared information 1070, communication path counter values 1071 indicate communication path counter values corresponding to respective sequence numbers. Random numbers 1072 indicate random numbers used as sequence numbers.

Returning to the description of FIG. 4, in step S205, the shared information management unit 102 updates information necessary for the generation of the sequence number column from the pseudorandom number sequence in step S203, among the encryption information stored in the encryption information storage unit 206. Here, as the information necessary for the generation of the sequence number column, the encryption information storage unit 206 stores, for example, the number of pseudorandom numbers unused for the generation of the sequence number column in step S203 among the pseudorandom numbers included in the pseudorandom number sequence generated in step S202 as well as information indicating the initial address. The shared information management unit 102 updates these pieces of information according to the usage of the pseudorandom number sequence.

For example, when the data size of each pseudorandom number included in the pseudorandom number sequence is b bits and the number of pseudorandom numbers is m, the pseudorandom number sequence of b×m bits is generated in step S202 described above. In such a case, when an outgoing message including a sequence number generated from one of the pseudorandom numbers included in the pseudorandom number sequence is generated and transmitted to another information processing apparatus 1, the shared information management unit 102 decreases, among the encryption information stored in the encryption information storage unit 206, the number of unused pseudorandom numbers by one, while changing the initial address thereof by b bits. In this way, the information necessary for the generation of the sequence number column is updated.

It is to be noted that when the number of unused pseudorandom numbers becomes equal to or less than a predetermined value as a result of the information updated in step S205 described above, it is preferable to execute the processing flow in FIG. 4 to generate a new pseudorandom number sequence and create a sequence number column based thereon. Furthermore, a predetermined number may be shared between each information processing apparatus preliminary, and every time the byte length of the pseudorandom number sequence generated from one seed reaches this number, reseeding (addition of an entropy source) may be performed or the seed may be updated. When reseeding, the method described in SP800-90A of the National Institute of Standards and Technology (NIST) can be employed, for example. However, the method of reseeding is not limited thereto as long as the method is feasible. Furthermore, when the seed is updated, one information processing apparatus 1 only needs to generate a seed for the update, and then encrypt and transmit the seed to another information processing apparatus 1, for example. However, the method of updating the seed is not limited thereto as long as the method is feasible. Performing reseeding or updating the seed in this way produces an effect that it will become even more difficult for a third party who does not know the seed to predict the sequence number.

After the processing in step S205 is executed, the shared information generation processing in FIG. 4 ends, and the process proceeds to step S30 in FIG. 3. Through the shared information generation processing described above, the information processing apparatus 1 can generate shared information to be shared with another information processing apparatus 1.

Figure 6:
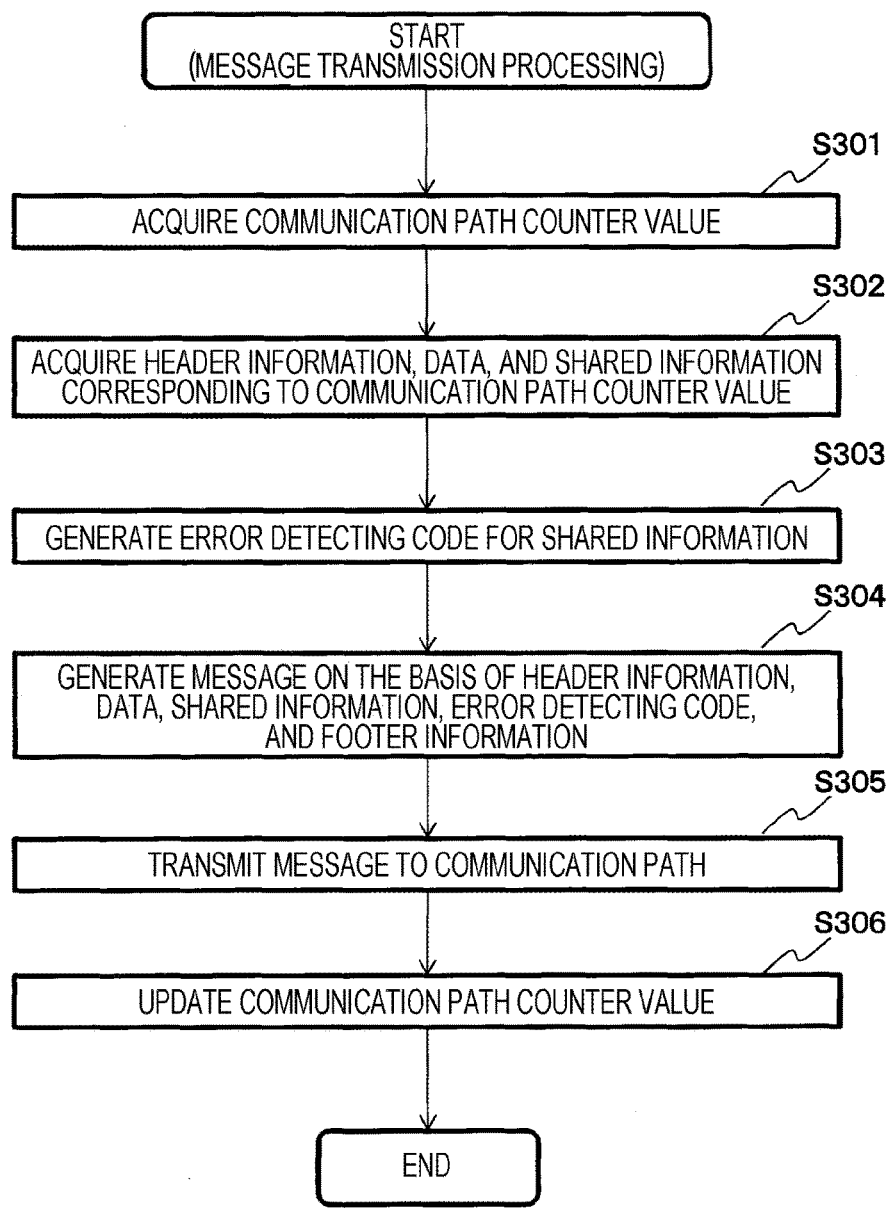
FIG. 6 is a flowchart of message transmission processing according to a first embodiment.

Next, a description will be given of the message transmission processing which is executed in step S40 in FIG. 3. In step S40, the CPU 10 can cause the message generation unit 104 to generate an outgoing message for determining, by using the shared information generated in step S20, whether there is any illegal replay attack, and transmit the outgoing message to another information processing apparatus 1. FIG. 6 is a flowchart of the message transmission processing according to the first embodiment of the present invention.

In step S301, the message generation unit 104 acquires, from the communication information storage unit 207, the communication path counter value which indicates the total number of messages which have been transmitted and received via the network 2 in FIG. 1. The communication path counter value acquired here only needs to be a consistent value among all the information processing apparatuses. For example, each time a message flows through the network 2, the message generation unit 104 of each information processing apparatus 1 may increment the communication path counter value and store the communication path counter value in the communication information storage unit 207. It is to be noted that all the information processing apparatuses 1 may employ a shared method for updating the communication path counter value. Alternatively, each information processing apparatus 1 may employ different updating methods as long as the updated counter value matches among all the information processing apparatuses 1.

In step S302, the message generation unit 104 acquires header information and data from the communication information storage unit 207, while acquiring, from the encryption information storage unit 206, shared information corresponding to the communication path counter value acquired in step S301. Here, the header information is information such as an arbitration field and a control field when the CAN FD is used as the network 2, for example. In other communication protocols, for example, information indicating a communication destination, a communication source, the length of data, and the like can be acquired as the header information. However, the header information acquired in step S302 is not limited thereto as long as necessary information is included as the header information.

In step S303, the security code generation unit 105 generates an error detecting code for the shared information acquired in step S302. Here, an error detecting code for detecting an error in the shared information is generated using a predetermined algorithm on the basis of the acquired shared information. For example, the error detecting code for the shared information can be generated according to an algorithm such as a cyclic redundancy check (CRC).

In step S304, the message generation unit 104 generates an outgoing message on the basis of the header information, the data, and the shared information acquired in step S302, the error detecting code generated in step S303, and footer information corresponding thereto. Here, the footer information is, for example, information on a periodic redundancy check field and an acknowledge field when the CAN FD is used as the network 2. However, the footer information acquired in step S304 is not limited thereto as long as necessary information is included as the footer information.

Figure 7:
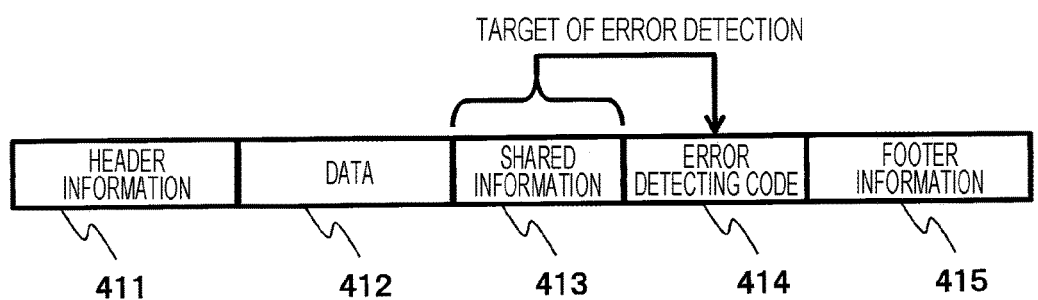
FIG. 7 is a diagram illustrating an example of a data structure of an outgoing message.

FIG. 7 is a diagram illustrating an example of the data structure of the outgoing message generated in step S304. The outgoing message includes header information 411, data 412, shared information 413, an error detecting code 414, and footer information 415.

Returning to the description of FIG. 6, in step S305, the message generation unit 104 outputs the outgoing message generated in step S304 to the communication unit 30. As a result, the generated outgoing message is transmitted from the communication unit 30 to another information processing apparatus 1 via the network 2.

In step S306, the message generation unit 104 updates the communication path counter value acquired in step S301 and stores the communication path counter value in the communication information storage unit 207.

After executing the processing in step S306, the message transmission processing in FIG. 6 ends, and the process proceeds to step S50 in FIG. 3. Through the message transmission processing described above, the information processing apparatus 1 can transmit, to the communication path, a message to which an error detecting code for the shared information is added as a security code.

Figure 8:
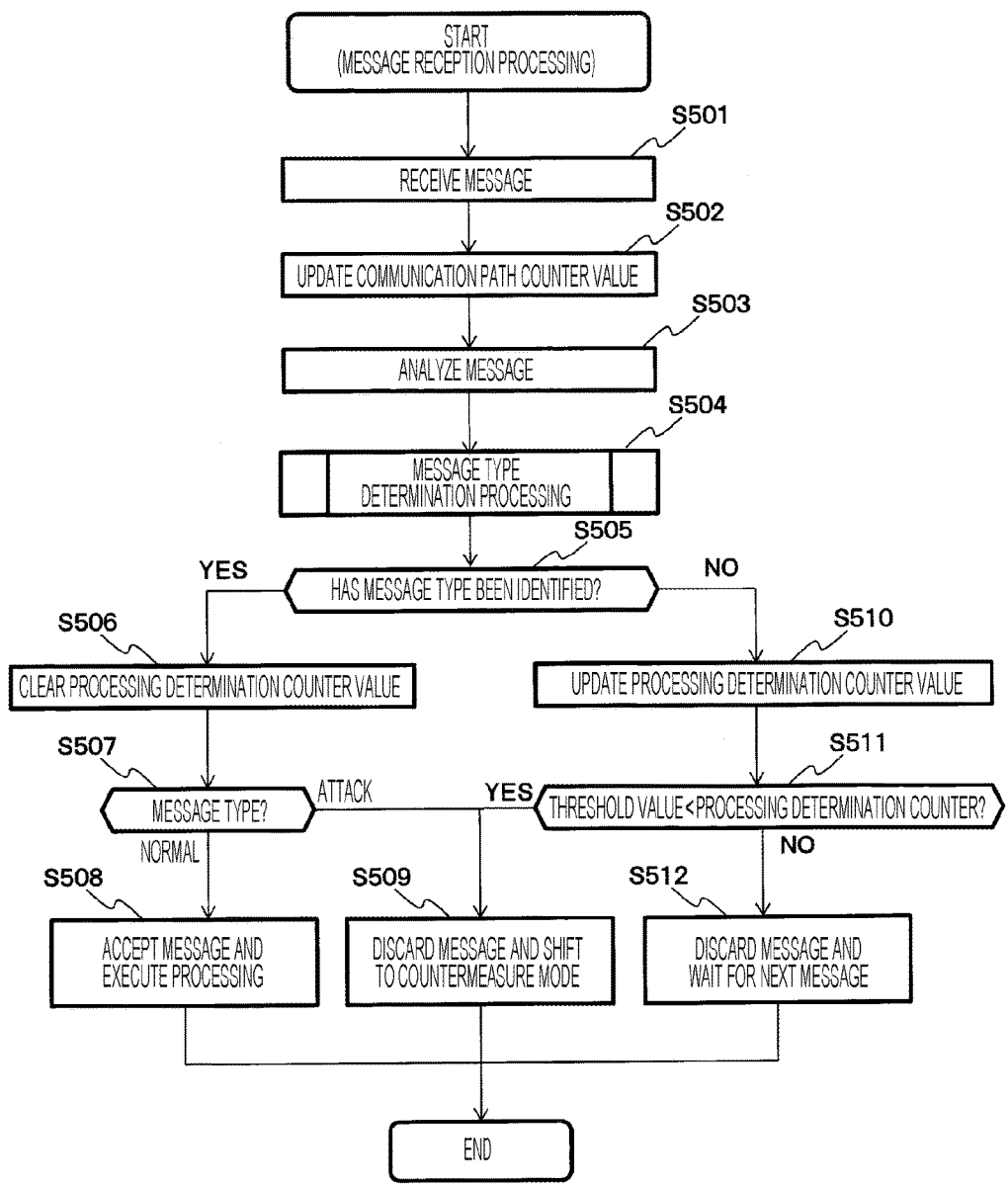
FIG. 8 is a flowchart of message reception processing.

Next, a description will be given of the message reception processing which is executed in step S60 in FIG. 3. In step S60, when the CPU 10 receives a message having the data structure illustrated in FIG. 6 from another information processing apparatus 1, the CPU 10 can determine whether the incoming message is due to an illegal attack by analyzing the data structure of the incoming message using the message analysis unit 108. FIG. 8 is a flowchart of the message reception processing.

In step S501, using the communication unit 30, the message analysis unit 108 receives a message transmitted from another information processing apparatus 1. Here, the incoming message is acquired by acquiring the message from another information processing apparatus 1 which has been received by the communication unit 30 and output to the CPU 10 by the communication unit 30.

In step S502, the message analysis unit 108 acquires the communication path counter value from the communication information storage unit 207, and updates the communication path counter value. It is to be noted that an arbitrary information processing apparatus may periodically transmit, to the communication path, a message to which a synchronization ID is added so that even if a disparity occurs in the communication path counter value managed in each information processing apparatus, the communication path counter value can be synchronized.

Figure 14:
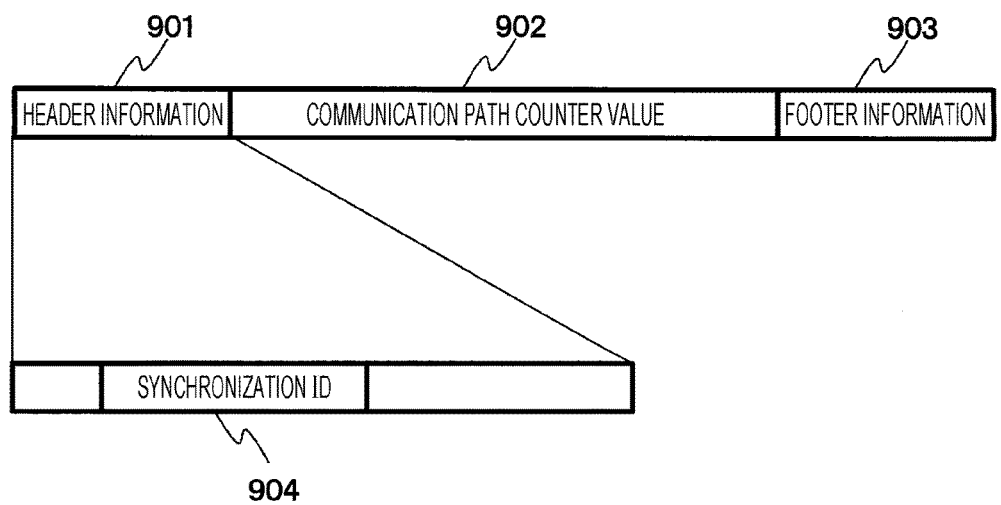
FIG. 14 is a diagram illustrating an example of a data structure of a message for synchronizing a communication path counter value.

FIG. 14 is a diagram illustrating an example of the data structure of the message for synchronizing the communication path counter value. The data structure of this message includes header information 901 to which synchronization ID 904 is added, a communication path counter value 902, and footer information 903.

Returning to the description of FIG. 8, in step S503, the message analysis unit 108 analyzes the data structure of the message received in step S501. Here, data, shared information, and an error detecting code included in the incoming message are each extracted by analyzing the data structure of the incoming message on the basis of the data structure as illustrated in FIG. 7.

In step S504, the processing determination control unit 109 performs message type determination processing for determining the type of the incoming message on the basis of the shared information and the error detecting code extracted from the incoming message in step S501. The specific details of this message type determination processing will be described later with reference to the flowchart in FIG. 9.

In step S505, the processing determination control unit 109 determines whether the type of the incoming message has been successfully identified by the message type determination processing in step S504. When the type of the incoming message has been successfully identified, the process proceeds to step S506, and when the type of the incoming message has failed to be identified, the process proceeds to step S510.

When the process proceeds from step S505 to step S506, the processing determination control unit 109 clears, in step S506, the value of the processing determination counter which indicates whether the type of the incoming message has been successfully identified. With this processing, when the type of the incoming message has been successfully identified by the message type determination processing in step S504, the value of the processing determination counter is cleared and returned to a predetermined initial value (for example, 0). Here, the processing determination counter is used for the determination of the type of the incoming message as described above, and is stored in the communication information storage unit 207.

In step S507, the processing determination control unit 109 determines whether the type of the incoming message identified by the message type determination processing in step S504 is "normal" or "attack". When the type of the incoming message is "normal", that is, when the incoming message is determined to be normal in step S504, the process proceeds to step S508. On the other hand, when the type of the incoming message is "attack", that is, when the incoming message is determined to be due to an illegal attack in step S504, the process proceeds to step S509.

In step S508, the processing determination control unit 109 accepts the incoming message. Accordingly, the CPU 10 executes control processing based on the data included in the incoming message.

In step S509, the processing determination control unit 109 discards the incoming message and shifts to a predetermined countermeasure mode. Here, the countermeasure mode is a mode by which when the incoming message is determined to be due to an illegal attack, the information processing apparatus 1 is shifted to a control state where the operation of the information processing system including the information processing apparatus 1 is not adversely affected. For example, for an information processing system mounted in a vehicle, it is preferable to set the countermeasure mode so that the information processing apparatus 1 is shifted to a control state where the safe vehicular operation is not affected.

The information processing apparatus 1 that has been shifted to the countermeasure mode discards all the subsequent incoming messages, which come from another information processing apparatus 1 and have the same ID as the above-described incoming message, for example. Alternatively, what is carried out for the countermeasure may be changed according to the type of attack. For example, when the incoming message is determined to be due to a replay attack in step S504, it is conceivable to warn the user while regenerating sequence numbers. For an information processing system mounted in a vehicle, it is possible to warn the user by displaying a predetermined warning screen on a car navigation apparatus, a mobile terminal apparatus connected to the vehicle, or the like.

On the other hand, when the process proceeds from step S505 to step S510, the processing determination control unit 109 increments and updates the value of the processing determination counter stored in the communication information storage unit 207 in step S510. Accordingly, when the type of the incoming message has failed to be determined by the message type determination processing in step S504, the value of the processing determination counter is increased by one.

In step S511, the processing determination control unit 109 compares the processing determination counter value incremented in step S510 with a predetermined threshold value. As a result, when the processing determination counter value is greater than the threshold value, the process proceeds to step S509. On the other hand, when the processing determination counter value is equal to or less than the threshold value, the process proceeds to step S512. It is to be noted that the magnitude of the threshold value compared with the processing determination counter value in step S511 may be changed according to the communication quality of the network 2 or the like. In this case, the threshold value may be set in advance on the basis of the design information of the information processing system, the test result before the operation start, or the like. Alternatively, the communication quality of the network 2 may be measured in real time and the threshold value may be changed correspondingly according to the result of the measurement.

When the process proceeds from step S511 to step S509, the processing determination control unit 109 determines that the incoming messages received so far have been due to an illegal attack, and discards the incoming messages as described above. The processing determination control unit 109 then shifts to the predetermined countermeasure mode.

In step S512, the processing determination control unit 109 discards the incoming message and waits until the next message is received. In this case, when the next message is received, the processing in step S501 onward in FIG. 8 is executed again.

After executing any of processing in steps S508, S509, and S512, the message reception processing in FIG. 8 ends. Through the message reception processing described above, the information processing apparatus 1 can determine whether the incoming message is normal or due to an illegal attack.

Figure 9:
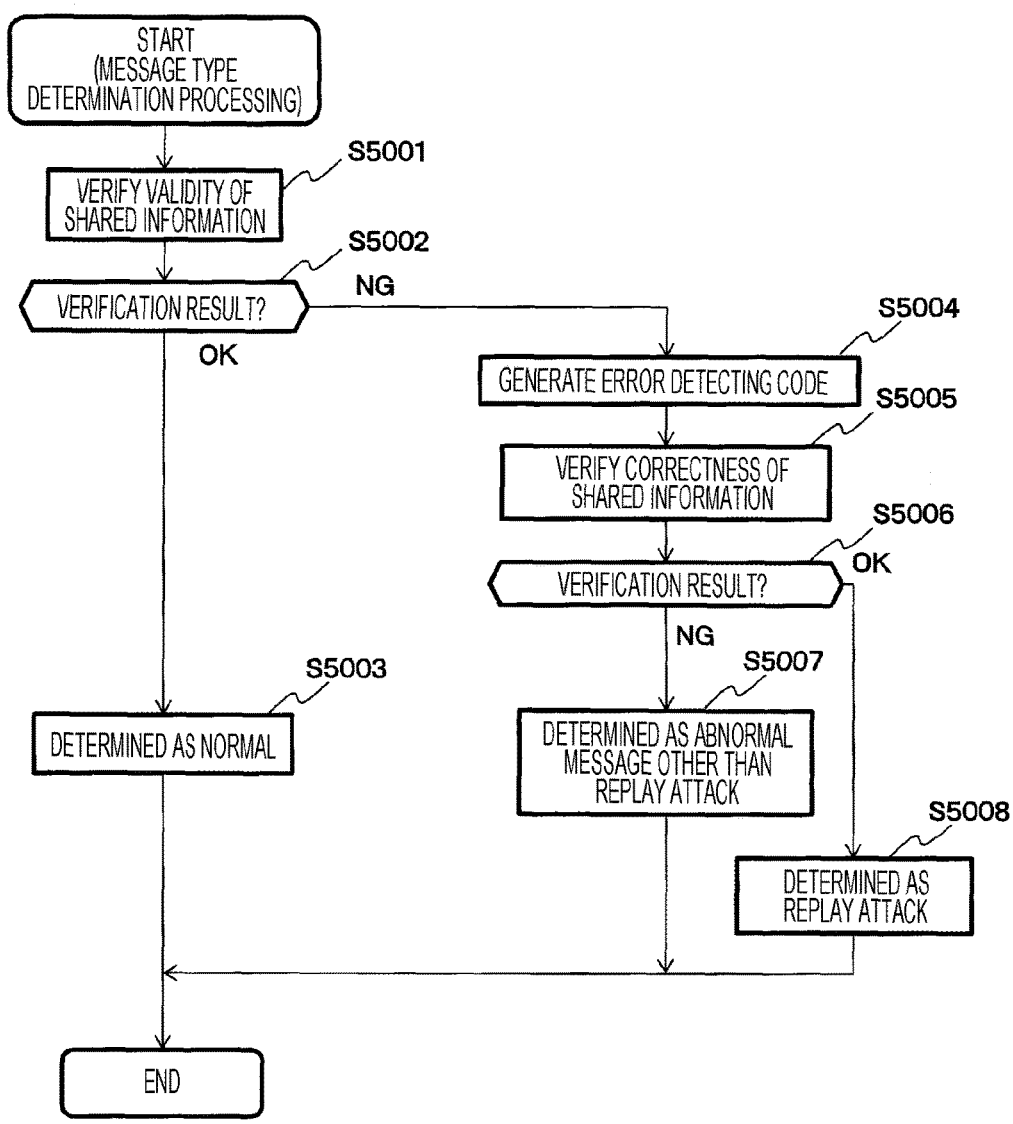
FIG. 9 is a flowchart of message type determination processing according to the first embodiment.

Next, a description will be given of the message type determination processing which is executed in step S504 in FIG. 8. FIG. 9 is a flowchart of the message type determination processing according to the first embodiment of the present invention.

In step S5001, the processing determination control unit 109 verifies the validity of the shared information included in the incoming message by using the shared information verification unit 110. Here, the shared information verification unit 110 acquires, from the encryption information storage unit 206, the shared information generated and stored by the shared information generation processing in step S20 in FIG. 3. Then, the acquired shared information and the shared information included in the incoming message are compared to determine whether they match. This determination only needs to be made according to a predetermined rule. For example, when the sequence number of the shared information included in the incoming message is rK and the sequence number corresponding to the incoming message in the shared information acquired by the shared information verification unit 110 is N, it is determined whether N=rK. When the result is N=rK, it is determined that the shared information included in the incoming message is valid and the verification result is OK. On the other hand, when the result is N≠rK, it is determined that the shared information included in the incoming message is illegal and the verification result is NG. It is to be noted that when the shared information verification unit 110 acquires a sequence number column as the shared information, it is possible to determine which sequence number corresponds to the incoming message in the sequence number column on the basis of the communication path counter value acquired in step S502 in FIG. 8.

In step S5002, the processing determination control unit 109 determines whether the verification result of the validity of the shared information performed in step S5001 is OK or NG. When the verification result is OK, the process proceeds to step S5003, and when the verification result is NG, the process proceeds to step S5004.

In step S5003, the processing determination control unit 109 determines that the incoming message is normal. Accordingly, the type of the incoming message is identified as "normal".

In step S5004, the processing determination control unit 109 generates an error detecting code based on the shared information included in the incoming message by using the security code generation unit 105. Here, the security code generation unit 105 can generate the error detecting code as a security code for the shared information included in the incoming message by performing similar processing to that in step S303 in FIG. 6.

In step S5005, the processing determination control unit 109 verifies the correctness of the shared information included in the incoming message by using the security code verification unit 111. Here, the security code verification unit 111 acquires, from the security code generation unit 105, the error detecting code generated in step S5004. Then, the acquired error detecting information and the error detecting code as a security code included in the incoming message are compared to determine whether they match. As a result, when both of the error detecting codes match, it is determined that there is no error in the shared information included in the incoming message and the verification result is OK. On the other hand, when the error detecting codes do not match, it is determined that there is an error in the shared information included in the incoming message and the verification result is NG.

In step S5006, the processing determination control unit 109 determines whether the verification result of the correctness of the shared information performed in step S5005 is OK or NG. When the verification result is OK, the process proceeds to step S5008, and when the verification result is NG, the process proceeds to step S5007.

In step S5007, the processing determination control unit 109 determines that the incoming message is an abnormal message resulting from a cause other than a replay attack. In this case, the type of the incoming message is not identified. It is to be noted that a possible cause of such an abnormal message is, for example, an accidental communication bit error due to noise or the like in the network 2 or an illegal attack other than the replay attack.

In step S5008, the processing determination control unit 109 determines that the incoming message is due to an illegal replay attack. In other words, in this case, since the shared information is not valid and there is no error in the shared information, it can be determined that the shared information has already been used and a third party who had illegally acquired this shared information has made the replay attack. Accordingly, the type of the incoming message is identified as "attack".

After executing any of steps S5003, S5007, and S5008, the message type determination processing in FIG. 9 ends, and the process proceeds to step S505 in FIG. 8. Through the message type determination processing described above, the information processing apparatus 1 can determine whether the incoming message is a replay attack.

According to the first embodiment of the present invention described above, the following operations and effects are achieved.

(1) The information processing apparatus 1 receives a message transmitted from another information processing apparatus 1 connected via the network 2. The information processing apparatus 1 includes the shared information generation unit 101, the communication unit 30, the shared information verification unit 110, the security code generation unit 105, the security code verification unit 111, and the processing determination control unit 109. The shared information generation unit 101 generates shared information to be shared with another information processing apparatus 1 (step S20). The communication unit 30 receives a message transmitted from another information processing apparatus 1 (step S501). The shared information verification unit 110 compares shared information included in the incoming message with the shared information generated by the shared information generation unit 101, and verifies the validity of the shared information included in the incoming message on the basis of the comparison result (step S5001). The security code generation unit 105 generates a security code based on the shared information (step S5004). The security code verification unit 111 compares a security code included in the incoming message with the security code generated by the security code generation unit 105, and verifies the correctness of the shared information included in the incoming message on the basis of the comparison result (step S5005). The processing determination control unit 109 determines the normality of the incoming message on the basis of the verification result of the shared information verification unit 110 and the verification result of the security code verification unit 111 (steps S5003, S5007, and S5008). In this way, each information processing apparatus 1 connected to the network 2 can correctly determine whether the message that has been received is due to an illegal attack.

(2) In step S5004, the security code generation unit 105 generates, as a security code, an error detecting code for detecting an error in the shared information. In step S5005, the security code verification unit 111 compares an error detecting code included in the incoming message with the error detecting code generated by the security code generation unit 105, and verifies the correctness of the shared information included in the incoming message on the basis of the comparison result. In this way, the correctness of the shared information can be easily and accurately verified.

(3) When the shared information verification unit 110 determines in step S5001 that the shared information included in the incoming message is valid, the processing determination control unit 109 determines in step S5003 that the incoming message is normal. On the other hand, when the shared information verification unit 110 determines in step S5001 that the shared information included in the incoming message is not valid, and the security code verification unit 111 determines in step S5005 that there is no error in the shared information included in the incoming message, it is determined in step S5008 that the incoming message is due to an illegal replay attack. In this way, whether the incoming message is normal or due to an illegal replay attack can be determined in a reliable manner.

(4) The information processing apparatus 1 further includes the communication information storage unit 207. The communication information storage unit 207 stores a processing determination counter value which is used by the processing determination control unit 109 to determine the normality of the incoming message. When the processing in step S5007 has been executed since the shared information verification unit 110 has determined in step S5001 that the shared information included in the incoming message is not valid and the security code verification unit 111 has determined in step S5005 that there is an error in the shared information included in the incoming message, the processing determination control unit 109 increments and updates the processing determination counter value (step S510). Then, the processing determination counter value and the predetermined threshold value are compared (step S511) to determine whether the incoming message is due to an illegal attack on the basis of the comparison result (steps S509 and S512). In this way, even when the incoming message is due to an illegal attack other than a replay attack, this can be determined.

(5) The information processing apparatus 1 further includes the message generation unit 104 in addition to the shared information generation unit 101, the communication unit 30, the shared information verification unit 110, the security code generation unit 105, the security code verification unit 111, and the processing determination control unit 109. The message generation unit 104 generates an outgoing message including shared information generated by the shared information generation unit 101 and a security code generated by the security code generation unit 105 (step S304). The communication unit 30 transmits this outgoing message to another information processing apparatus 1 and also receives an incoming message from another information processing apparatus 1. In this way, among the plurality of information processing apparatuses 1, the message transmission and reception as well as the message authentication can be performed.

Second Embodiment

Hereinafter, the second embodiment of the present invention will be described. In the second embodiment, a description will be given of an example where an error correcting code and a tampering detection code are used as security codes instead of the error detecting code described in the first embodiment. It is to be noted that since the configuration of the information processing system according to the present embodiment and the configuration of the information processing apparatus 1 are similar to those in the first embodiment, description thereof will be omitted. In addition, since the processing executed by the CPU 10 is the same as that in the first embodiment except for the message transmission processing illustrated in FIG. 6 and the message type determination processing illustrated in FIG. 9, description thereof will be omitted.

Figure 10:
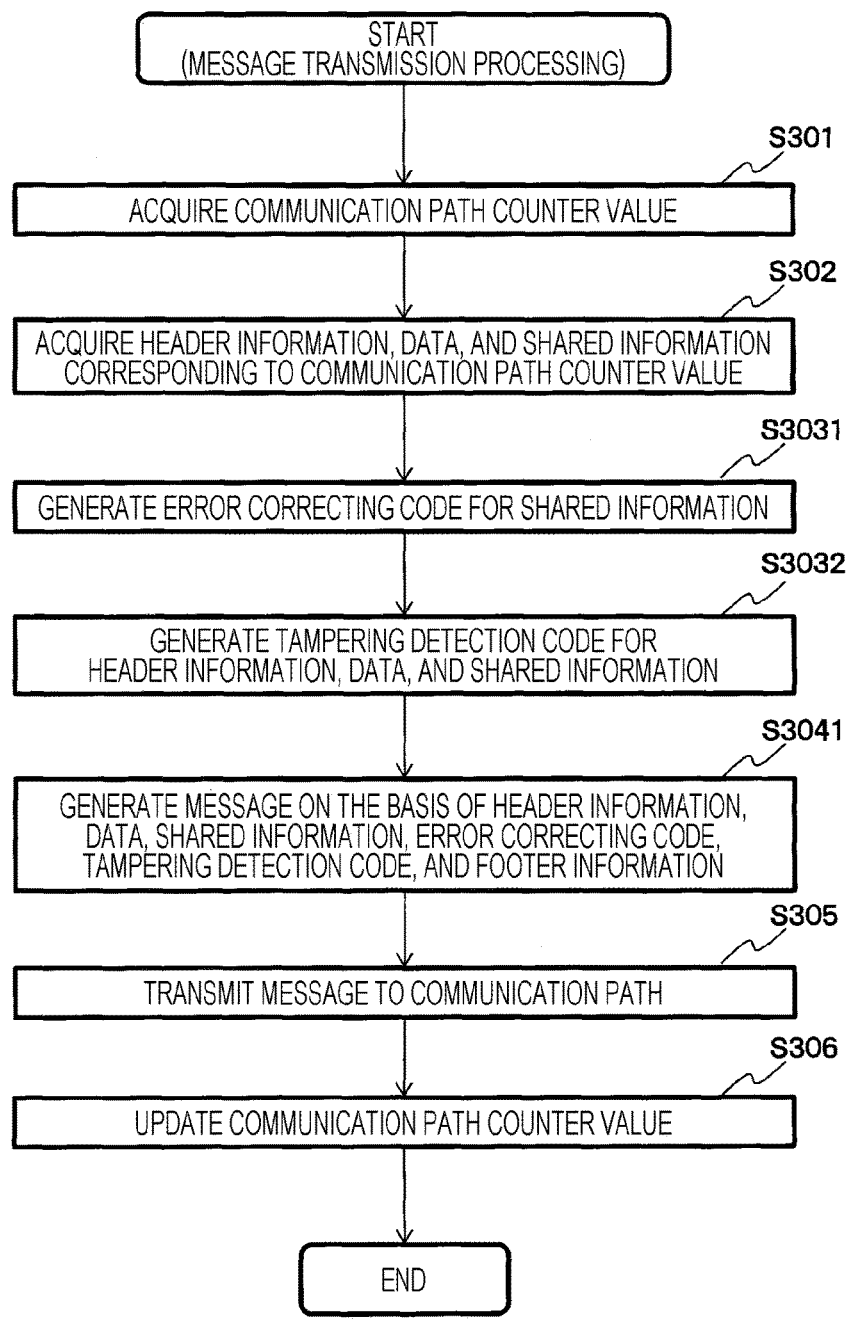
FIG. 10 is a flowchart of message transmission processing according to a second embodiment.

FIG. 10 is a flowchart of the message transmission processing according to the second embodiment of the present invention. This flowchart is different from the flowchart of the message transmission processing according to the first embodiment illustrated in FIG. 6 in that the processing of steps S3031, S3032, and S3041 is executed instead of the processing of steps S303 and S304.

In step S3031, the security code generation unit 105 generates an error correcting code for the shared information acquired in step S302. Here, an error correcting code for detecting and correcting an error in the shared information is generated using a predetermined algorithm on the basis of the acquired shared information. For example, the error correcting code can be generated by calculating an error correcting code (ECC) corresponding to the shared information with a predetermined polynomial. At this time, the correction range of the error correcting code to be generated may be set on the basis of the communication quality of the network 2 through which an outgoing message passes. For example, when the average number of bits of a communication error, which is generated when the outgoing message passes through the network 2, is n bits, it is preferable to generate an error correcting code capable of correcting n bits or more in step S3031. It is to be noted that the correction range of the error correcting code can be set by appropriately selecting a polynomial used for the calculation of the ECC, for example.

In step S3032, the security code generation unit 105 generates a tampering detection code for the header information, the data, and the shared information acquired in step S302. Here, on the basis of the header information, the data, and the shared information that have been acquired, the tampering detection code for detecting whether these pieces of information have been tampered with is generated. For example, the tampering detection code can be generated by calculating a message authentication code (MAC) using a predetermined algorithm. It is to be noted that as methods of calculating the MAC, the one using a hash function and the one using a block cipher algorithm are known, for example. In addition, the advanced encryption standard (AES) which is a common key block cipher algorithm may be used. Specifically, when a data string, which includes header information, data, and shared information to be calculated for the MAC as well as padding data added thereto corresponding to the block length, is subjected to predetermined processing as an input message, a block cipher having 128 bits or the like is output. This block cipher can be used as the MAC. Besides this, any method can be employed to generate the tampering detection code. It is to be noted that the tampering detection code may be generated on the basis of part of the information among the header information, the data, and the shared information of the outgoing message.

In step S3041, the message generation unit 104 generates an outgoing message on the basis of the header information, the data, and the shared information acquired in step S302, the error correcting code generated in step S3031, the tampering detection code generated in step S3032, and footer information corresponding thereto. In step S305, this outgoing message is output to the communication unit 30, and then transmitted.

Figure 11:
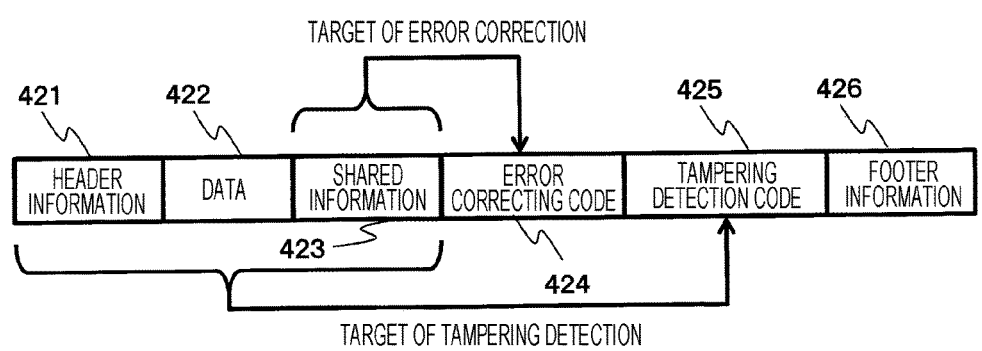
FIG. 11 is a diagram illustrating an example of a data structure of an outgoing message.

FIG. 11 is a diagram illustrating an example of the data structure of the outgoing message generated in step S3041. The outgoing message includes header information 421, data 422, shared information 423, an error correcting code 424, a tampering detection code 425, and footer information 426. It is to be noted that the header information 421, the data 422, the shared information 423, and the footer information 426 are similar to the header information 411, the data 412, and the shared information 413, respectively, of the outgoing message in FIG. 7 described in the first embodiment.

Figure 12:
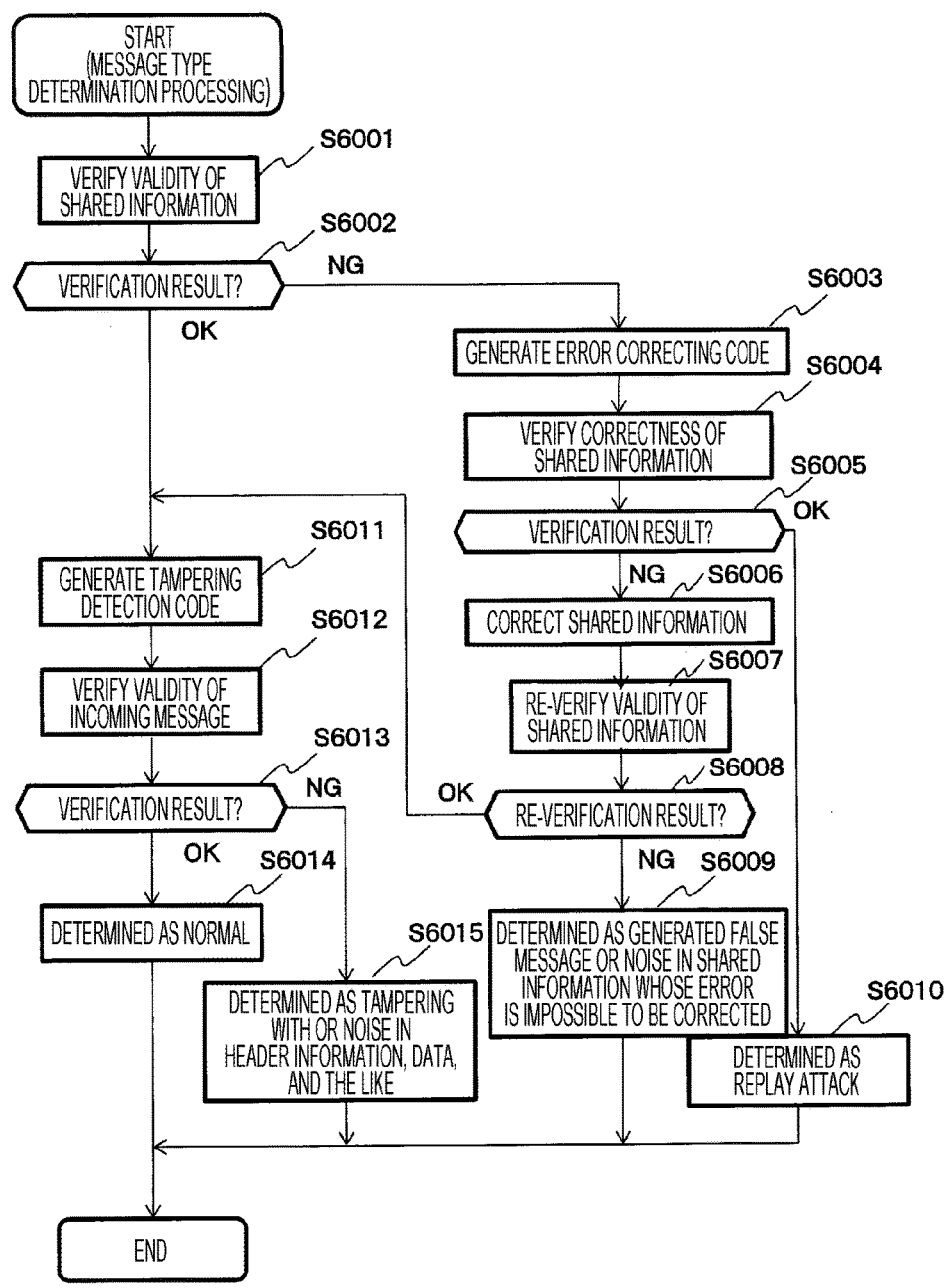
FIG. 12 is a flowchart of message type determination processing according to the second embodiment.

FIG. 12 is a flowchart of the message type determination processing according to the second embodiment of the present invention.

In steps S6001 and S6002, the processing determination control unit 109 performs processing similar to those of steps S5001 and S5002 in FIG. 9, respectively.

In step S6003, the processing determination control unit 109 generates an error correcting code based on the shared information included in the incoming message by using the security code generation unit 105. Here, the security code generation unit 105 can generate the error correcting code as a security code for the shared information included in the incoming message by performing similar processing to that in step S3031 in FIG. 10.

In step S6004, the processing determination control unit 109 verifies the correctness of the shared information included in the incoming message by using the security code verification unit 111. Here, the security code verification unit 111 uses the error correcting code generated in step S6003 instead of the error detecting code, and performs similar processing to that in step S5005 in FIG. 9. As a result, when there is no error in the shared information included in the incoming message, the verification result is determined to be OK, and when there is an error, the verification result is determined to be NG.

In step S6005, the processing determination control unit 109 determines whether the result of the verification of the correctness of the shared information performed in step S6004 is OK or NG. When the verification result is OK, the process proceeds to step S6010, and when the verification result is NG, the process proceeds to step S6006.

In step S6006, the processing determination control unit 109 corrects the shared information included in the incoming message by using the security code verification unit 111. Here, the security code verification unit 111 corrects the shared information included in the incoming message by performing calculation according to a predetermined algorithm, using the error correcting code generated in step S6003. Accordingly, for example, when the Hamming distance of the ECC, which is the error correcting code, is within a certain range, an error included in the shared information of the incoming message can be corrected. However, when the shared information included in the incoming message contains many errors, the shared information cannot be completely corrected and thus the errors may remain even if the error correcting code is used.

In step S6007, the processing determination control unit 109 re-verifies the validity of the shared information included in the incoming message by using the shared information verification unit 110. Here, the shared information verification unit 110 compares the shared information acquired from the encryption information storage unit 206 with the shared information whose error has been corrected in step S6006, and determines whether they match as in step S6001. As a result, when the acquired shared information and the shared information after the error correction match, it is determined that the shared information included in the incoming message is valid and the re-verification result is OK. On the other hand, when they do not match, it is determined that the shared information included in the incoming message is illegal and the re-verification result is NG.

In step S6008, the processing determination control unit 109 determines whether the result of the re-verification of the validity of the shared information performed in step S6007 is OK or NG. When the re-verification result is OK, the process proceeds to step S6011, and when the re-verification result is NG, the process proceeds to step S6009.

In step S6009, the processing determination control unit 109 determines whether the incoming message is an abnormal message due to an illegal attack using a preliminary generated false message, or an abnormal message due to the noise of the shared information whose error is impossible to be corrected. In this case, the type of the incoming message is not identified.

In step S6010, the processing determination control unit 109 determines that the incoming message is due to an illegal replay attack, as in step S5008 in FIG. 9. Accordingly, the type of the incoming message is identified as "attack".

In step S6011, the processing determination control unit 109 generates a tampering detection code based on the header information, the data, and the shared information included in the incoming message by using the security code generation unit 105. Here, the security code generation unit 105 can generate the tampering detection code as a security code for the header information, the data, and the shared information included in the incoming message by performing similar processing to that in step S3032 in FIG. 10.

In step S6012, the processing determination control unit 109 verifies the validity of the incoming message by using the security code verification unit 111. Here, the security code verification unit 111 acquires, from the security code generation unit 105, the tampering detection code generated in step S6011. Then, the acquired tampering detection code and the tampering detection code as a security code included in the incoming message are compared to determine whether they match. As a result, when both of the tampering detection codes match, it is determined that the incoming message is a valid message that has not been tampered with and the verification result is OK. On the other hand, when the tampering detection codes do not match, it is determined that the incoming message is an illegal message that has been tampered with and the verification result is NG.

In step S6013, the processing determination control unit 109 determines whether the result of the verification of the validity of the incoming message, which has been performed in step S6012, is OK or NG. When the verification result is OK, the process proceeds to step S6014, and when the verification result is NG, the process proceeds to step S6015.

In step S6014, the processing determination control unit 109 determines that the incoming message is normal, as in step S5003 in FIG. 9. Accordingly, the type of the incoming message is identified as "normal".

In step S6015, the processing determination control unit 109 determines that the incoming message is an abnormal message due to an illegal attack using a false message generated by tampering with the header information, the data, and the like in real time, or an abnormal message due to noise in the header information, the data, and the like. In this case, the type of the incoming message is not identified, as in step S6009.

After executing any of steps S6009, S6010, S6014, and S6015, the message type determination processing in FIG. 12 ends, and the process proceeds to step S505 in FIG. 8. Through the message type determination processing described above, the information processing apparatus 1 can determine whether the incoming message is a replay attack, an attack by a false message which has been prepared in advance, or an attack by a false message generated in real time.

According to the second embodiment of the present invention described above, the following operations and effects are further achieved in addition to the operations and effects (1) and (5) described in the first embodiment.

(6) In step S6003, the security code generation unit 105 generates an error correcting code as a security code for detecting and correcting an error in the shared information. In step S6004, the security code verification unit 111 compares an error correcting code included in the incoming message with the error correcting code generated by the security code generation unit 105, and verifies the correctness of the shared information included in the incoming message on the basis of the comparison result. In this way, the correctness of the shared information can be easily and accurately verified.

(7) When the security code verification unit 111 detects in step S6004 that there is an error in the shared information included in the incoming message, the security code verification unit 111 corrects the shared information on the basis of the error correcting code (step S6006). The shared information verification unit 110 compares the shared information corrected by the security code verification unit 111 with the shared information generated by the shared information generation unit 101, and re-verifies the validity of the shared information included in the incoming message on the basis of the comparison result (step S6007). In this way, even when an error occurs in part of the shared information of the incoming message due to an accidental communication bit error or the like, whether the shared information is valid can be determined in a reliable manner.

(8) In addition to the error correcting code, the security code generation unit 105 further generates, as a security code, a tampering detection code for detecting tampering with the data and the shared information included in the incoming message (step S6011). The security code verification unit 111 compares a tampering detection code included in the incoming message with the tampering detection code generated by the security code generation unit 105, and further verifies the validity of the incoming message on the basis of the comparison result (step S6012). In this way, whether the incoming message is due to an illegal attack can be determined in a more correct manner.

(9) When the shared information verification unit 110 determines in step S6001 that the shared information included in the incoming message is valid and the security code verification unit 111 determines in step S6012 that the incoming message is valid, the processing determination control unit 109 determines in step S6014 that the incoming message is normal. On the other hand, when the shared information verification unit 110 determines in step S6001 that the shared information included in the incoming message is not valid, and the security code verification unit 111 determines in step S6004 that there is no error in the shared information included in the incoming message, the incoming message is determined to be due to an illegal replay attack in step S6010. In this way, whether the incoming message is normal or due to an illegal replay attack can be determined in a reliable manner.

(10) The information processing apparatus 1 further includes the communication information storage unit 207. The communication information storage unit 207 stores a processing determination counter value which is used by the processing determination control unit 109 to determine the normality of the incoming message. When the processing in step S6015 has been executed since the shared information verification unit 110 has determined in step S6001 that the shared information included in the incoming message is valid and the security code verification unit 111 has determined in step S6012 that the incoming message is not valid, or when the processing in step S6009 has been executed since the shared information verification unit 110 has determined in step S6001 that the shared information included in the incoming message is not valid and the security code verification unit 111 has determined in step S6004 that there is an error in the shared information included in the incoming message, the processing determination control unit 109 increments and updates the processing determination counter value (step S510). Then, the processing determination counter value and the predetermined threshold value are compared (step S511) to determine whether the incoming message is due to an illegal attack on the basis of the comparison result (steps S509 and S512). In this way, even when the incoming message is due to an illegal attack other than a replay attack, this can be determined.

(11) The security code generation unit 105 may set the correction range of the error correcting code according to the communication quality of the network 2. In this way, the correction range of the error correcting code can be set appropriately.

It is to be noted that an error detecting code may be used instead of the error correcting code or the tampering detection code in the second embodiment described above. When an error detecting code is used instead of the error correcting code, in step S3031 in FIG. 10, the security code generation unit 105 performs similar processing to that in step S303 in FIG. 6. Likewise, an error detecting code is generated in a similar manner in step S6003 in FIG. 12. In this case, the processing in steps S6006 to S6008 in FIG. 12 is not executed. By contrast, when an error detecting code is used instead of the tampering detection code, in step S3032 in FIG. 10, the security code generation unit 105 generates, on the basis of the header information, the data, and the shared information that has been acquired in step S302, the error detecting code for detecting whether there is any error in these pieces of information. Likewise, an error detecting code is generated in a similar manner in step S6011 in FIG. 12. It is to be noted that the error detecting code generated for this case only needs to include at least data as a target of the error detection. Even in this way, similar operations and effects to those described above can also be achieved.

Furthermore, no tampering detection code may be added to a message to be transmitted and received between the information processing apparatuses 1 in the second embodiment described above. In this case, the processing in step S3032 in FIG. 10 and the processing in steps S6011 to S6013 and S6015 in FIG. 12 are not executed. Even in this way, similar operations and effects to those described above can also be achieved.

Third Embodiment

Hereinafter, the third embodiment of the present invention will be described. In the third embodiment, a description will be given of an example of dividing and transmitting a message among the plurality of information processing apparatuses 1. For example, when the CAN is used as the network 2, dividing a message allows the message to be transmitted and received according to the communication protocol of the CAN. It is to be noted that since the configuration of the information processing system according to the present embodiment and the configuration of the information processing apparatus 1 are similar to those of the first and the second embodiments, description thereof will be omitted. In addition, since the processing executed by the CPU 10 is the same as that in the first embodiment or the second embodiment, description thereof will be omitted.

In the present embodiment, when the message generation unit 104 of the information processing apparatus 1 on the transmitting side outputs an outgoing message to the communication unit 30 in step S305 in FIG. 6 or FIG. 10, the message generation unit 104 can divide and output the outgoing message into a plurality of messages. In this way, the message is transmitted from the communication unit 30 through the network 2 to another information processing apparatus 1 in a state where the original message structure is divided.

Figure 13:
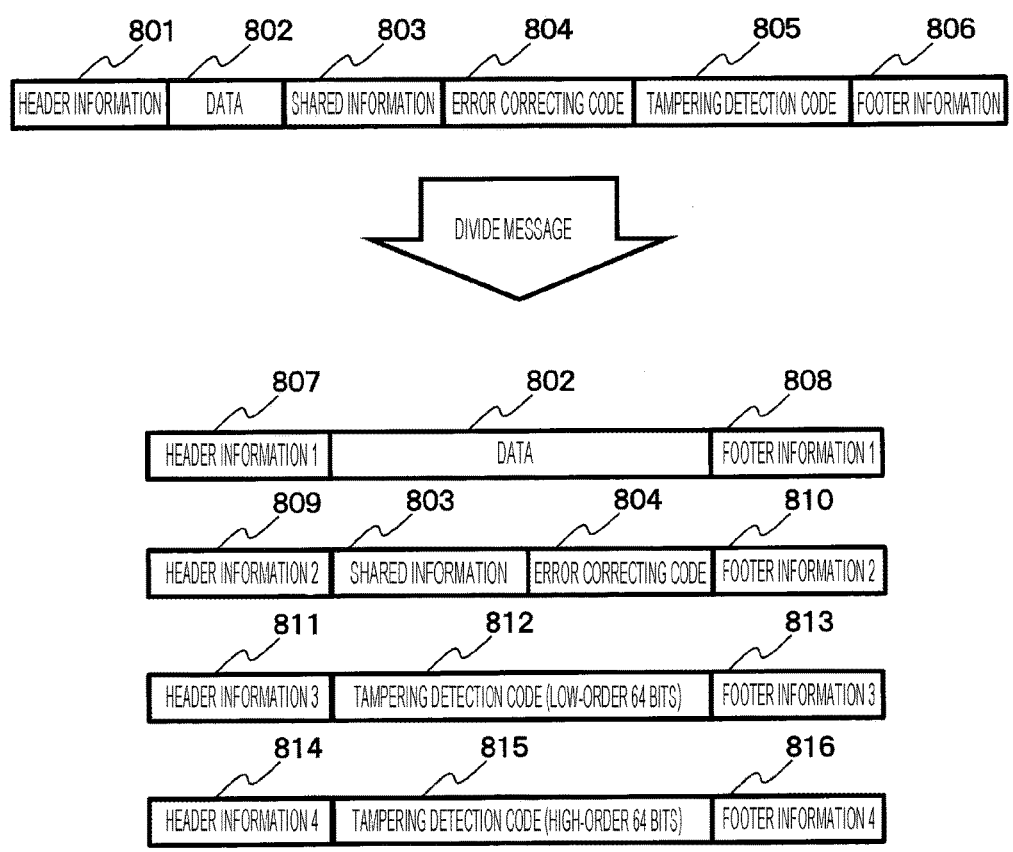
FIG. 13 is a diagram illustrating an example of an outgoing message divided into four messages.

FIG. 13 is a diagram illustrating an example of the outgoing message divided into four messages by the message generation unit 104. The example of FIG. 13 illustrates an example in which the outgoing message including header information 801, data 802, shared information 803, an error correcting code 804, a tampering detection code 805, and footer information 806 is divided into four. It is to be noted that the outgoing message before division can be generated by the method described in the second embodiment.

Header information 807, 809, 811, and 814, and footer information 808, 810, 813, and 816 added to the respective divided outgoing messages illustrated in FIG. 13 are information unique to the communication protocol of the CAN. By contrast, the data 802 in the first divided message and the shared information 803 and 804 in the second divided message are identical to those before division. In addition, a tampering detection code 812 in the third divided message corresponds to the low-order 64 bits of the tampering detection code 805 before division, while a tampering detection code 815 in the fourth divided message corresponds to the high-order 64 bits of the tampering detection code 805 before division. It is to be noted that the example of FIG. 13 indicates a case where the data field in the communication protocol of the CAN is 64 bits, and the number of bits of the data 802 and the total number of bits of the shared information 803 and the error correcting code 804 are 64 bits each. The outgoing message can be divided in this way, for example. However, the method of dividing the message is not limited thereto. For example, when there is any remainder in 64 bits of the data field, padding may be performed with a 0-bit value.

By contrast, when the message analysis unit 108 of the information processing apparatus 1 on the receiving side receives, from the communication unit 30, the message divided into the plurality of messages as described above, the message analysis unit 108 accumulates the plurality of divided messages up to the original message length. When the divided messages are accumulated up to the original message length, the message analysis unit 108 removes the header information and the footer information from each of the divided messages, and arranges the divided messages in sequence so that the original message before division is reproduced. After that, the message reception processing in FIG. 8 is performed using the reproduced message before division. At this time, in step S502 in FIG. 8, it is preferred that the message analysis unit 108 updates the communication path counter value only when the first divided message is received, and does not update the communication path counter value when the remaining divided messages are received. It is to be noted that as a method of associating each of the divided messages, for example, the message analysis unit 108 of the information processing apparatus 1 on the receiving side may handle the ID of the message including the data 802 and the ID of the message including the shared information 803, the error correcting code 804, and the tampering detection code 805 as different series, and make a determination using an association table for each ID. However, the method of associating the messages is not limited thereto.

According to the third embodiment of the present invention described above, the information processing apparatus 1 accumulates, when a message is divided and transmitted into a plurality of messages by another information processing apparatus 1, the plurality of divided messages, which have been received by the communication unit 30, up to the original message length to reproduce the message before division. In this way, a message can be transmitted and received among the plurality of information processing apparatuses according to the communication protocol of the network.

It is to be noted that in the third embodiment described above, the information processing apparatus 1 on the transmitting side may be able to optionally select whether to divide an outgoing message in transmission. Furthermore, in this case, the message generation unit 104 may generate an outgoing message such that the information amounts of the shared information and the security code of the outgoing message to be divided and transmitted are less than those in the case where the outgoing message is transmitted without being divided. In this case, at least either one of the information amounts obtained by individually adding up the shared information and the security code included in each divided outgoing message when the outgoing message is divided and transmitted is less than the information amount of the shared information or the information amount of the security code included in the outgoing message when the outgoing message is transmitted without being divided. In this way, even when the outgoing message is divided and transmitted, the increase in the amount of communication data due to the division can be suppressed as much as possible.

Specifically, for example, depending on whether the outgoing message is divided, the information processing apparatus 1 on the transmitting side changes the setting conditions applied when the shared information generation unit 101 generates shared information, the setting conditions applied when the security code generation unit 105 generates a security code, and the like. This makes it possible to arbitrarily adjust the information amounts of the shared information and the security code in the outgoing message generated by the message generation unit 104, and achieve the state as described above.

It is to be noted that each of the embodiments and various modifications described above is merely an example, and the present invention is not limited thereto as long as the features of the invention are not impaired. The present invention is not limited to the embodiments and modifications described above, and various modifications can be made without departing from the spirit of the present invention.

The disclosure of the following priority application is herein incorporated by reference:

Japanese Patent Application No. 2014-230715 (filed on Nov. 13, 2014)

REFERENCE SIGNS LIST

1 information processing apparatus
2 network
20 memory
30 communication unit
40 bus
101 shared information generation unit
102 shared information management unit
103 key management unit
104 message generation unit
105 security code generation unit
108 message analysis unit
109 processing determination control unit
110 shared information verification unit
111 security code verification unit
206 encryption information storage unit
207 communication information storage unit

The invention claimed is:

1. An information processing apparatus that protects a computer network against replay attacks, the information processing apparatus comprising:
   a communication interface that is communicatively coupled to other information processing apparatus via a network;
   a memory; and
   a processor that is communicatively coupled to the communication interface and the memory; wherein the processor:
   receives, using the communication interface, a message transmitted from the other information processing apparatus, wherein the message includes shared information and a security code;
   verifies validity of the shared information by comparing the shared information with generated shared information stored in the memory;
   generates a generated security code based on the shared information, wherein the generated security code is an error detecting code for detecting an error in the shared information and a correction range of the error correcting code is set according to a communication quality of the network;
   verifies correctness of the shared information by comparing the security code with the generated security code;
   on a condition that the validity of the message is verified, identifies the message as a normal message;
   on a condition that the validity and the correctness of the message are not verified, identifies the message as an error message; and
   on a condition that the validity of the message is not verified and the correctness of the message is verified, identifies the message as a replay attack message and causes the information processing apparatus to enter a countermeasure mode.

2. The information processing apparatus according to claim 1, wherein when the message is identified as the error message, the processor:
  corrects the shared information to formed corrected shared information based on the error correcting code, and
  re-verifies the validity of the shared information by comparing the corrected shared information with the generated shared information generated.

3. The information processing apparatus according to claim 1, wherein when the message is identified as the normal message the processor:
  generates a generated tampering detection code for detecting tampering with data; and
  identifies the message as a tampered message by comparing a tampering detection code included in the message with the generated tampering detection code.

4. The information processing apparatus according to claim 1, wherein the memory further stores:
  a counter value to be used to determine the normality of the message,
  wherein when the message is identified as the normal message, the processor further:
  updates the counter value, and
  determines whether the message is due to an illegal attack by comparing the counter value with a predetermined threshold value to.

5. The information processing apparatus according to claim 1, wherein the processor further:
  reproduces, when the message is divided into a plurality of divided messages and transmitted by the other information processing apparatus, the message before division by accumulating the plurality of divided messages received up to an original message length.

6. An information processing system that protects a computer network against replay attacks, the information processing system comprising:
  a plurality of information processing apparatus that are communicatively coupled via a network, wherein each of the plurality of information processing apparatus include:
    a communication interface that is communicatively coupled to the network;
    a memory; and
    a processor that is communicatively coupled to the communication interface and the memory;
  wherein the processor of each respective information processing apparatus from the plurality of information processing apparatus:
  generates shared information;
  generates a security code based on the shared information, wherein the generated security code is an error detecting code for detecting an error in the shared information and a correction range of the error correcting code is set according to a communication quality of the network;
  generates an outgoing message including the shared information and the security code;
  transmits, using the communication interface, the outgoing message to the plurality of information processing apparatus;
  receives, using the communication interface, an incoming message that includes incoming shared information and an incoming security code;
  verifies validity of the incoming shared information by comparing the incoming shared information with the shared information
  verifies correctness of the incoming shared information by comparing the incoming security with the security code;
  on a condition that the validity of the incoming message is verified, identifies the incoming message as a normal message;
  on a condition that the validity and the correctness of the incoming message are not verified, identifies the incoming message as an error message; and
  on a condition that the validity of the incoming message is not verified and the correctness of the incoming message is verified, identifies the incoming message as a replay attack message and causes the respective information processing apparatus to enter a countermeasure mode.

7. The information processing apparatus according to claim 6, wherein the processor further:
  divides and transmits the outgoing message, and
  at least either one of information amounts obtained by individually adding up the shared information and the security code included in each divided outgoing message when the outgoing message is divided and transmitted is less than an information amount of the shared information or an information amount of the security code included in the outgoing message when the outgoing message is transmitted without being divided.

8. A method for authenticating a message to protect a computer network against replay attacks the method comprising:
  receiving a message transmitted from an other information processing apparatus, wherein the message includes shared information and a security code;
  verifying validity of the shared information by comparing the shared information with generated shared information stored in a memory;
  generating a generated security code based on the shared information, wherein the generated security code is an error detecting code for detecting an error in the shared information and a correction range of the error correcting code is set according to a communication quality of the network;
  verifying correctness of the shared information by comparing the security code with the generated security code; on a condition that the validity of the message is verified, identifies the message as a normal message;
  on a condition that the validity and the correctness of the message are not verified, identifying the message as an error message; and
  on a condition that the validity of the message is not verified and the correctness of the message is verified, identifying the message as a replay attack message and causing an information processing apparatus to enter a countermeasure mode.

* * * * *